United States Patent [19] [11] 4,201,934
Esaki [45] May 6, 1980

[54] EXTERNAL SENSOR FOR ELECTRONIC FLASH

[75] Inventor: Koreaki Esaki, Suita, Japan

[73] Assignee: West Electric Co., Ltd., Osaka, Japan

[21] Appl. No.: 888,629

[22] Filed: Mar. 21, 1978

[30] Foreign Application Priority Data

Mar. 25, 1977 [JP] Japan ............................. 52-36718[U]

[51] Int. Cl.² .......................................... H05B 41/32
[52] U.S. Cl. ................................... 315/151; 315/135;
 315/241 P; 354/33; 354/35; 354/145
[58] Field of Search ..................... 315/151, 159, 241 P,
 315/134–136; 354/33, 35, 127, 128, 140, 145

[56] References Cited

U.S. PATENT DOCUMENTS

| | | | |
|---|---|---|---|
| 3,688,659 | 9/1972 | Takishima et al. | 354/128 |
| 3,774,072 | 11/1973 | Ogawa | 315/151 |
| 3,846,806 | 11/1974 | Yata et al. | 354/145 X |
| 4,125,766 | 11/1978 | Höltje | 354/128 X |

Primary Examiner—Eugene R. LaRoche
Attorney, Agent, or Firm—Burgess, Ryan and Wayne

[57] ABSTRACT

An external sensor which may be detachably electrically connected to an electronic flash of the type having a flash duration control circuit for controlling the flash duration of a flash tube which flashes by discharging the electrical energy stored on a main capacitor, the external sensor including a light receiving unit which, in the automatic flash exposure mode, receives the light emitted from the flash and reflected back from a subject. In the automatic flash exposure mode in which the flash duration control circuit is activated in response to an interrupt signal from the light receiving unit, the external sensor selectively displays correct flash exposure data such as film speed, aperture and distance to a subject.

4 Claims, 4 Drawing Figures

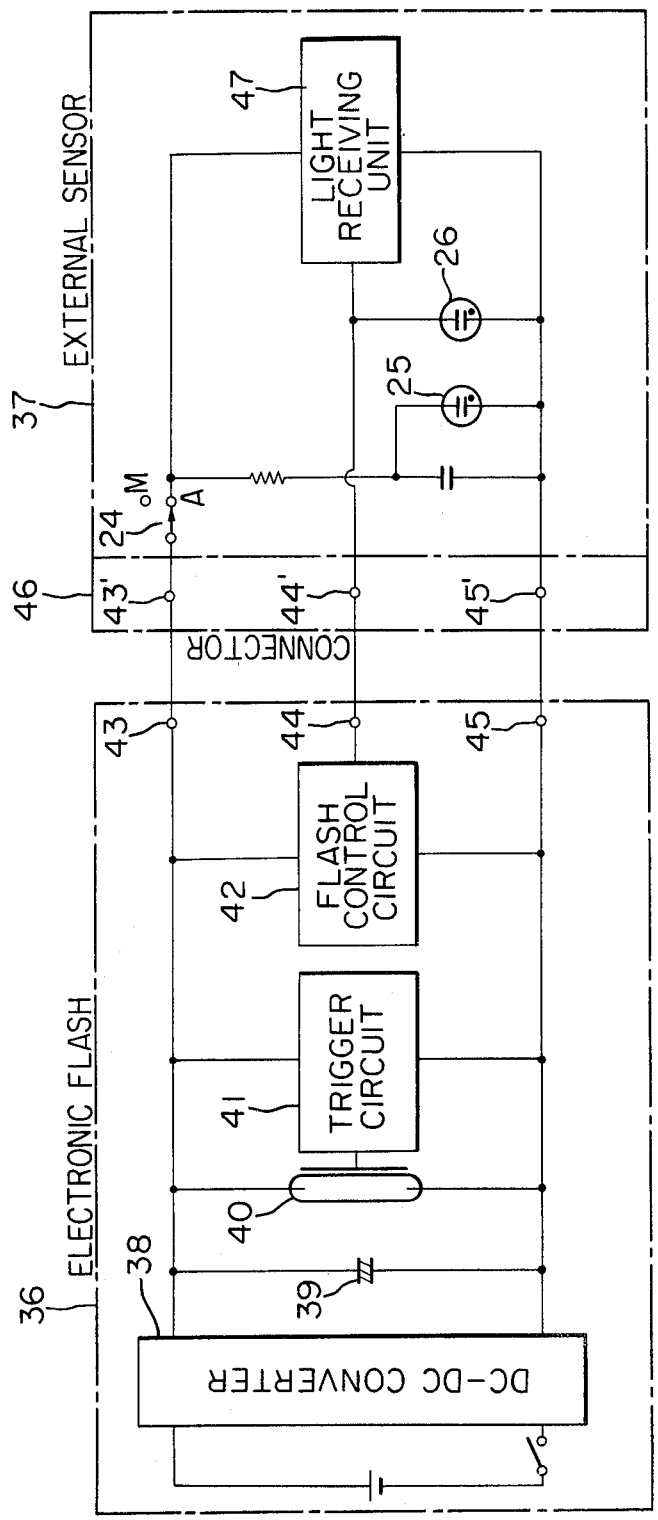

EXTERNAL SENSOR FOR ELECTRONIC FLASH

BACKGROUND OF THE INVENTION

The present invention relates to an external sensor which may be detachably electrically connected to an electronic flash of the type including a flash duration control circuit for controlling the flash duration of a flash tube which flashes by discharging the electrical energy stored on a main capacitor, the external sensor including a light receiving unit which generates the flash interrupt signal in response to which said flash duration control circuit is activated when the amount of received light reaches a predetermined level.

An external sensor of the type described is disclosed in detail in for instance U.S. Pat. No. 3,774,072. The external sensor is mounted on a camera and is electrically connected to an electronic flash which is spaced apart from the camera so that a subject may be illuminated by the light emitted from the electronic flash and bounced from walls and ceilings. In the "automatic flash exposure mode", when the amount of light reflected back from the subject and received by the external sensor reaches a predetermined level, the external sensor generates the flash interrupt signal in response to which the electronic flash is deactivated. In the "manual flash exposure mode", the flash duration is controlled manually so that the external sensor must be kept deactivated. Therefore when the "automatic flash exposure mode" is switched over to the "manual flash exposure mode", the external sensor must be mechanically and electrically disconnected from the electronic flash so that the switching over from the automatic mode to the manual mode or vice versa is very cumbersome.

In order to overcome this problem there has been invented and demonstrated an external sensor capable of being switched over from the automatic mode to the manual mode or vice versa, but this sensor is still unsatisfactory in practice because a user tends to fail very often to set the external sensor into a desired mode by operating a mode selection switch which is external to a casing of the external sensor.

In general, the external sensors of the type described above are provided with dials bearing the film speeds, the apertures, the distances to a subject, the guide numbers and so on so that optimum flash exposure data may be selected. However, these exposure data dials are quite ordinarily provided with the whole scales of each exposure data. For instance, a film speed dial may be graduated with ASA 25 to 400, a distance dial, with 4 to 10 meters and an aperture dial, with f2 to f22. Therefore even when specific flash exposure data is determined: the film speed, for example, to be ASA 100, the aperture, f8 and a distance to the subject, 5 meters, all other numbers on these exposure data dials are also visible around the correct numbers. Consequently correct setting and reading of these exposure data dials are rather difficult so that underexposures or overexposures result very often.

SUMMARY OF THE INVENTION

Accordingly one of the objects of the present invention is to provide an external sensor for an electronic flash which may positively avoid the erratic selection of the automatic or manual mode and which may display only the required flash exposure data, whereby an optimum flash exposure may be ensured without any fault.

To the above and other end, briefly stated, the present invention provides an external sensor detachably connected to an electronic flash of the type having a flash control circuit capable of controlling a flash duration of a flash tube which flashes by discharging the energy stored on a main capacitor, said external sensor comprising a light receiving unit for generating a flash interrupt signal when the amount of light reflected back from a subject and received by said light receiving unit has reached a predetermined level and for transmitting said flash interrupt signal to said flash control circuit in said electronic flash, a mode selection electronic flash, a mode selection switch for selecting an automatic flash exposure mode wherein the flash duration is controlled by said flash interrupt signal from said light receiving unit or a manual flash exposure mode wherein said light receiving unit is disabled, a display means which is turned on when said mode selection switch is set to said automatic flash exposure mode, exposure data display means which bear the flash exposure data such as film speed, aperture, distance to a subject and so on and which are illuminated by said display means in said automatic flash exposure mode, a pair of molds which house said light receiving unit, said mode selection switch, said light emitting display means and said flash exposure data display means, and a window through one of said pair of molds for permitting a user to view the data displayed by said flash exposure data display means.

BRIEF DESCRIPTION OF THE DRAWINGS

FIG. 4 is a schematic circuit diagram of an electronic flash and the external sensor connected thereto.

DESCRIPTION OF THE PREFERRED EMBODIMENT

Figure 1:
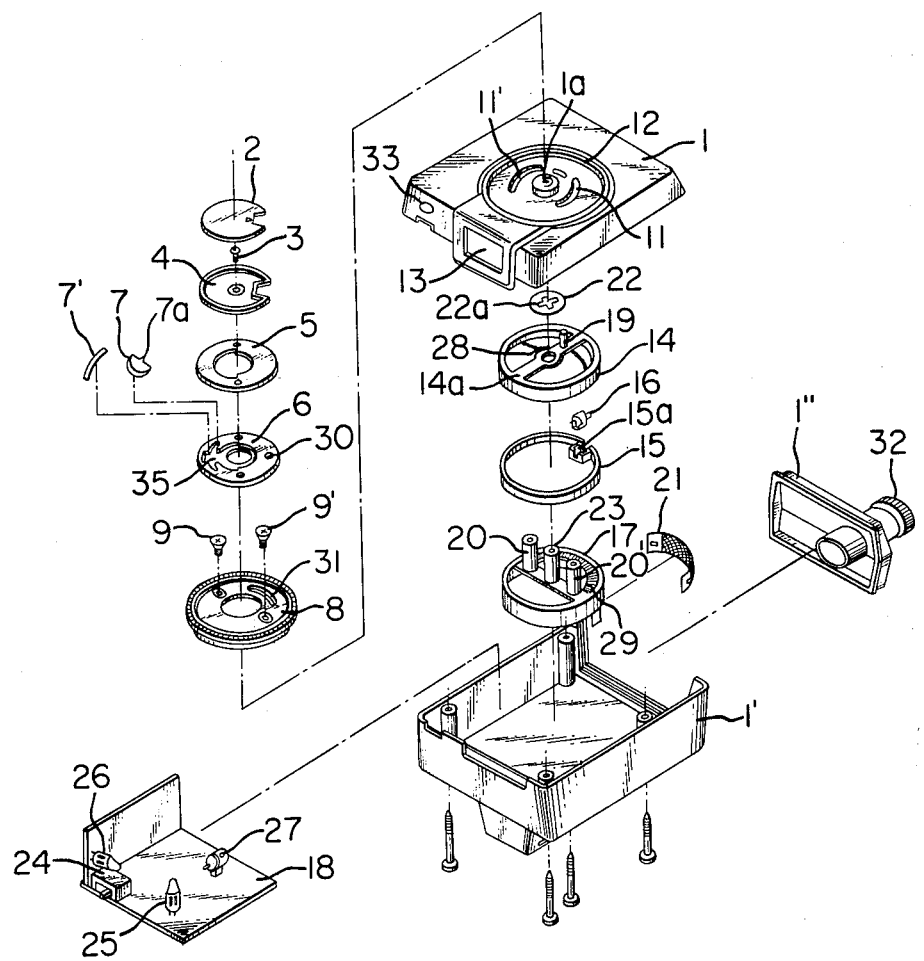
FIG. 1 is an exploded view of a preferred embodiment of an external sensor in accordance with the present invention.

Referring to the accompanying drawings and particularly to FIG. 1, a preferred embodiment of an external sensor in accordance with the present invention may be in general divided into an external mechanism external to an upper mold 1 and a lower mold 1' and an internal mechanism internal to the upper and lower molds 1 and 1'.

The external mechanism includes a distance dial 2 which is graduated with distances to a subject and mounted on a distance dial mounting disk 4, a film sensitivity or speed dial 5 which is graduated with film speeds or sensitivity such as DIN and/or ASA and mounted on a film speed dial mounting disk 6, a ratchet stop 7 to be described in detail hereinafter, a spring 7', screws 3, 9 and 9' and a coupling disk 8 for coupling between the external and internal mechanisms. A user sets a distance to a subject with the distance dial 2 and selects a film speed with the film speed setting dial 5.

Figure 3:
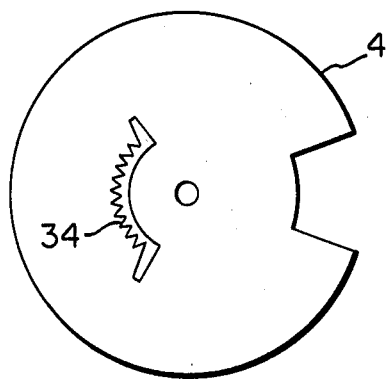
FIG. 3(a) is a bottom view, on enlarged scale, of a dial mounting disk 4 shown in FIG. 1.
FIG. 3(b) is a bottom view, on enlarged scale, of a dial mounting disk 6 shown in FIG. 1.
Figure 3:
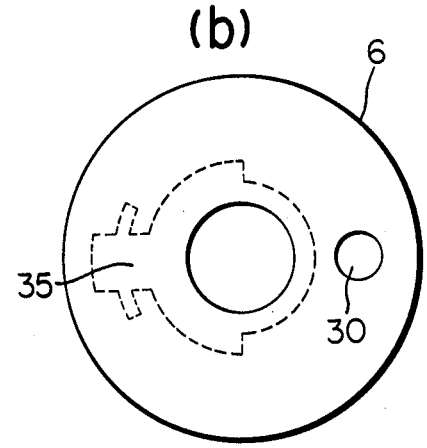

The distance dial mounting disk 4 is mounted on the upper mold 1 with the screw 3 extended through apertures of the dial 5, the mounting disk 6 and the coupling disk 8 and screwed into a tapped hole 1a of the upper mold 1. As shown in FIG. 3 (a), the mounting disk 4 has a stop ratchet or ratchet teeth 34 formed on the bottom and inserted into a recess 35 of the mounting disk 6. A pawl 7a of the ratchet stop 7 engages with the stop ratchet 34, and the ratchet stop 7 is normally biased toward the stop ratchet 34 under the force of the bias spring 7' fitted into the arcuate slots (See FIG. 3(b)). Therefore the mounting disk 6 may be rotated stepwise, and the angle of rotation of the mounting disk 6 is limited by an arcuate slot 12 formed through the top of the upper mold 1 and the internal mechanism as will be described in detail hereinafter.

The coupling disk 8 may be rotated steplessly, and the angle of rotation of the disk 8 is limited by arcuate slots 11 and 11' formed through the top of the upper mold 1.

The internal mechanism includes a transparent filmspeed dial 14, a transparent aperture dial 15, a transparent distance dial 17, an elastic retaining ring 22 with a hole 22a which is fitted over a pin 23 extended upwardly from the distance dial 17 and extended through a center aperture 14a of the film speed dial 14, a gear 16 rotatably carried in a vertical recess 15a of the aperture dial 15, an optical filter 21 attached to the distance dial 17, a selection switch 24 to be described in detail hereinafter, lamps 25 and 26 such as neon tubes for illuminating the transparent dials 14, 15 and 17 and signaling the "automatic flash exposure" as will be described in detail hereinafter, a photoelectric transducer 27 and an electric circuit 18 to be described in detail hereinafter with reference to FIG. 4.

The film speed dial 14 has a pin 19 extended upright and a semi-circular gear 28 which is internally threaded at the bottom and is made into engagement with the gear 16. The pin 19 is extended through the arcuate slot 12 of the upper mold 1 and an arcuate slot 31 formed through the coupling disk 8 and is fitted into a hole 30 at the bottom of the mounting disk 6 (See FIG. 3(b)). Therefore the aperture dial 5 or its mounting disk 6 may rotate in unison with the film speed dial 14.

The distance dial 17 has a pair of upright pins 20 and 20' in addition to the upright pin 23 and a semicircular internally threaded gear 29 in mesh with the gear 16. The optical filter 21 which is attached to the periphery of the distance dial 17 may continuously vary the amount of light transmitted therethrough and received by the transducer 27 so that in case of the "automatic flash exposure" the aperture may be set to one of for example five values.

The screws 9 and 9' are fitted into holes of the coupling disk 8 and the arcuate slots 11 and 11' of the upper mold 1 and are screwed into tapped holes of the upright projections 20 and 20' of the distance dial 17. Therefore the coupling disk 8 may be rotated in unison with the distance dial 17 and hence the optical filter 21 so that the amount of light intercepted by the photoelectric transducer 27 may be varied.

In the preferred embodiment of the present invention, the optical filter 21 consists of a perforated thin metal sheet, but it is to be understood that any other suitable optical means for controlling the amount of light to be transmitted to the photoelectric transducer 27 may be employed.

The aperture dial 15 which is interposed between the film speed dial 14 and the distance dial 17 has the gear 16 in mesh with the gears 28 and 29 as described above so that upon rotation of either of the film speed dial 14 or the distance dial 17, the aperture dial 15 is caused to rotate. However, the rotation of the film speed dial 14 or the distance dial 17 will not cause the rotation of the other.

When the film speed dial mounting disk 6 is rotated to set a film speed, the film speed dial 14 is also rotated so that the aperture dial 15 is also rotated. That is, in response to the change in film speed, the aperture is varied, but the distance dial 17 remains stationary. In like manner, upon rotation of the coupling disk 8, the distance dial 17 is caused to rotate, changing the distance to the subject so that the aperture dial 15 is also caused to rotate, changing the aperture in response to a newly set distance, but the film speed dial 14 may remain stationary without changing the indication.

The pitches and numbers of teeth of the gears 16, 28 and 29 are so selected that a predetermined relationship among the film sensitivity, the aperture and the distance to a subject may be maintained. The film speed, aperture and distance dials 14, 15 and 17 are graduated accordingly.

The mode selection switch 24 is interposed between the upper and lower molds 1 and 1' so that the user may set it to either "the automatic mode" or "the manual mode". When the mode selection switch 24 is set to the automatic mode, the lamp 25 is turned on to illuminate the film speed, aperture and distance dials 14, 15 and 17 so that the user may read these dials through a window 13. Therefore the lamp 25 is positioned within these dials 14, 15 and 17 when assembled. The lamp 26 is turned on when the "automatic flash exposure" has been accomplished, which the user may see through a window 33. The photoelectric transducer 27 receives the light transmitted through a lens barrel or hood 32 and the optical filter 21.

Figure 2:
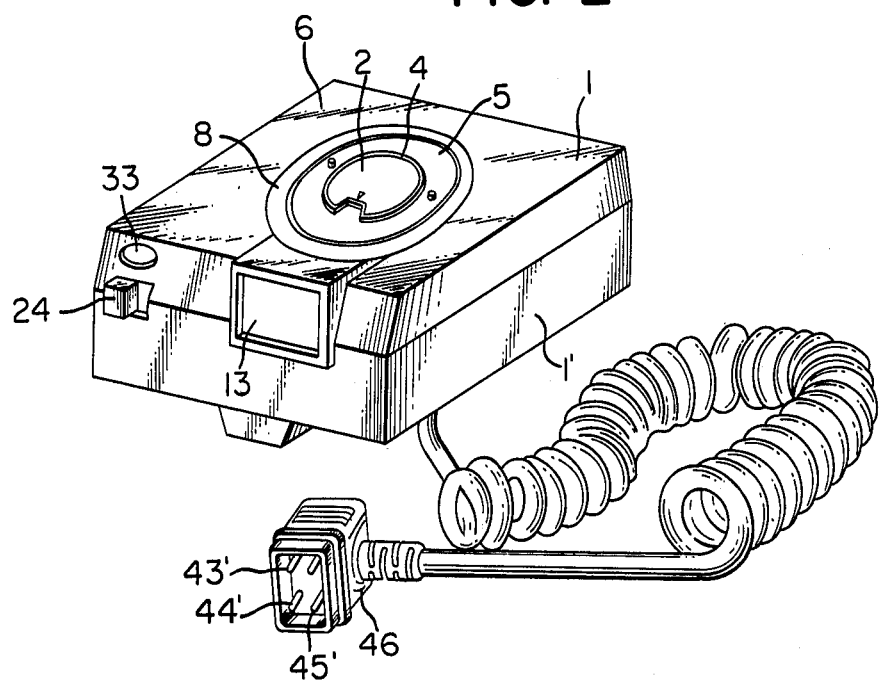
FIG. 2 is a perspective view of the assembled external sensor.

The external sensor is assembled as shown in FIG. 2 and is electrically connected through a connector 46 with pins 43', 44' and 45' to an electronic flash 36 shown in FIG. 4.

Referring to FIG. 4, the pins 43', 44' and 45' of the external sensor 37 are connected to terminals 43, 44 and 45 of the electronic flash 36.

In case of the "automatic flash exposure mode" the mode selection switch 24 closes a terminal A. When an on-off switch of the flash 36 is turned on, a main capacitor 39 is charged with a high voltage direction current supplied from a DC-DC converter 38. When the charging voltage rises above a predetermined level, the lamp 25 is turned on to illuminate the film speed, aperture and distance dials 14, 15 and 17 in the manner described above so that the user may read the exposure data through the window 13. Next the user sets a film speed, an aperture and a distance with the external dials 2, 5 and 8. Since the internal dials 14, 15 and 17 are illuminated by the lamp 25, no missetting will occur.

When the ignition voltage of the lamp 25 is low, the lamp 25 may be turned on a very short time after the power switch has been closed or even when the voltage charged across the main flash capacitor 39 is still low, whereby the user may confirm earlier that the electronic flash 36 and the external sensor 37 have been set into the "automatic flash exposure mode". In this embodiment, a flash tube 40 is used, but it will be understood that an incandescent lamp may be used.

When the voltage across the main capacitor 39 rises to a predetermined level, a trigger circuit 41 is activated so that the flash tube 40 flashes. The light reflected back from a subject is received by the external sensor 37 and is converted into the electrical signal by the photoelectric transducer 27. When the amount of light received by the transducer 27 reaches a predetermined level, the flash interrupt signal is transmitted through the terminals 44' and 44 to a flash control circuit 42, whereby the flash tube 40 is de-energized.

The lamp 26 is also turned on in response to this flash interrupt signal from a light receiving unit 47, signalling the user the completion of the "automatic flash exposure".

In case of the "manual flash exposure", the user operates the mode selection switch 24 to close the terminal M. Then the lamp 25 is turned off, signalling that the external sensor has been set into the "manual flash exposure mode". That is, all of the components in the external sensor 37 are disabled since the light receiving unit 47 is not connected to a power supply.

The flash control circuit shown in FIG. 4 is of the main capacitor bypassing type disclosed in detail in U.S. Pat. No. 3,774,072, but as is disclosed in U.S. Pat. No. 3,896,333, a semiconductor switching element may be connected in series to the flash tube 40 for controlling the flash duration thereof.

What is claimed is:

1. An external sensor detachably connected to an electronic flash of the type having a flash control circuit capable of controlling the flash duration of a flash tube which flashes by discharging the energy stored on a main capacitor, said external sensor comprising
    (a) a light receiving unit for generating a flash interrupt signal when the amount of light reflected back from a subject and received by said light receiving unit has reached a predetermined level and for transmitting said flash interrupt signal to said flash control circuit in said electronic flash,
    (b) a mode selection switch for selecting an automatic flash exposure mode wherein the flash duration is controlled by said flash interrupt signal from said light receiving unit or a manual flash exposure mode wherein said light receiving unit is disabled,
    (c) a display means which is turned on when said mode selection switch is set to said automatic flash exposure mode,
    (d) flash exposure data display means for displaying flash exposure data comprising film speed, aperture, and distance to a subject, said display means being illuminated by said first-mentioned display means in said automatic flash exposure mode,
    (e) a pair of molds which house said light receiving unit, said mode selection switch, said first-mentioned display means and said flash exposure data display means, and
    (f) a window through one of said pair of molds for permitting a user to view the data displayed by said flash exposure data display means.

2. An external sensor as set forth in claim 1 wherein said flash exposure data display means includes
    a first dial means which is transparent and which is graduated with film speeds,
    a second dial means which is transparent and which is graduated with aperture values,
    a third dial means which is transparent and which is graduated with distances to a subject, and
    coupling means for operatively coupling among said first, second and third dial means.

3. An external sensor as set forth in claim 2 further comprising an external exposure data display means which is external to said pair of molds and which is operatively coupled to one of said first, second and third dial means, whereby said film speed, said aperture or said distance to a subject may be externally displayed.

4. An external sensor as set forth in claim 1 further comprising a light emitting display means which is turned on in response to said flash interrupt signal.

* * * * *